United States Patent Office 3,065,247
Patented Nov. 20, 1962

3,065,247
REACTION PRODUCT OF EPOXIDIZED FATTY ACID ESTERS OF LOWER ALKANOLS AND POLYAMINO COMPOUNDS
Melvin de Groote and Jen Pu Cheng, University City, Mo., assignors to Petrolite Corporation, Wilmington, Del., a corporation of Delaware
No Drawing. Filed Nov. 23, 1955, Ser. No. 548,749
10 Claims. (Cl. 260—404.5)

The present invention is concerned with the reaction products of certain epoxidized monohydric alcohol esters and polynitrogenous compounds, i.e., compounds having 2 or more nitrogen atoms and preferably basic amino compounds, i.e., compounds in which there is at least one and in many instances 2 or more basic nitrogen atoms.

The products herein described may be employed for a large variety of purposes either as such or after conversion into salts.

The products also may be used as intermediates for further reaction.

For purpose of convenience what is said hereinafter will be divided into six parts:

PART 1 is concerned with the derivatives obtained by the epoxidation of fatty acid esters of monohydric alcohols and generally characterized by the presence of at least one oxirane ring per fatty acid molecule;

PART 2 is sub-divided into nine sections, and is concerned with polynitrogenous, preferably polyamino compounds which are non-resinoid in nature and may or may not include in their structure a hydrophobe group, i.e., a group having 8 or more uninterrupted carbon atoms in a single radical, or the like. Such amino reactants must contain a reactive hydrogen atom generally attached to either nitrogen or oxygen. The presence of such reactive hydrogen atom is necessary for reaction with the oxirane ring. Stated another way, such reactants must be oxyalkylation susceptible;

PART 3 is concerned with reactions involving the two classes of reactants above, i.e., those described in Part 1 and those described in Part 2;

PART 4 is concerned with conversion of the reactants in salts by combination with carboxy acids, sulfonic acids, and the like;

PART 5 is concerned with various uses for the products described in Part 3 or their salts described in Part 4; and PART 6 is concerned with derivatives which can be prepared by further reaction with the products described in Part 3 by the use of some additional reactant, such as an alkylene oxide or the like. Furthermore, in many instances the products obtained in the manner described in Part 3, preceding, can be heated without the addition of any other reactant so that ring formation or other reactions take place, thus yielding a completely different series of products.

In actual practice commercially available epoxidized esters represent a product which may vary from a 70% or 75% yield up to 80% or even 85% or 90%, based on the presence of a single oxirane ring per fatty acid radical as representing 100% yield.

In our co-pending application, Serial No. 532,121, filed September 1, 1955, we have described a broad genus of compounds obtained by the process of reacting (A) an oxirane ring-containing compound obtained by epoxidation of an epoxidation susceptible fatty acid, fatty acid ester, fatty acid amide or fatty alcohol with (B) certain oxyalkylation susceptible compounds having at least one labile hydrogen atom.

The present invention is concerned with a sub-genus or specie of the aforementioned generic invention described in our co-pending application, Serial No. 532,121.

The present invention is limited to reactions involving epoxidized monohydric alcohol esters having at least one and not over 2 oxirane rings per fatty acid molecule and certain oxyalkylation susceptible polyamino compounds having as functional groups only primary amino groups, secondary amino groups and hydroxyl groups and having at least one such functional amino group, particularly polyalkylene amines such as ethylene diamine, diethylene triamine, triethylene tetramine, tetraethylene pentamine, and higher alkylene amines as well as certain other comparable polyamines in which the nitrogen atoms are separated by a radical having more than 2 carbon atoms such as amino amides, imidazolines, and the like, as more fully described in the following Section 2.

PART 1

Although esters of various monohydric alcohols can be employed for any one of a number of reasons, our preference is to use low molal aliphatic alcohols and particularly butyl alcohol i.e., the butyl ester. If such ester is derived from a polyethylenic acid in which a number of oxirane rings can be introduced one could, of course, have as many as 2 oxirane rings per acyl radical. This would also be the case if butyl ricinoleate, for example, were esterified with oleic acid or soybean fatty acid. Here, again, an oxirane ring could be introduced in the ricinoleyl radical and also in the unsaturated radical which had been linked by virtue of the ricinoleyl hydroxyl radical. Similarly, soybean fatty acid can be esterified with high molal unsaturated alcohols such as those derived from soybean oil and the like. In such instances an oxirane ring could be introduced in both the acyl radical position and the alcohol residue position. Going a step further, one might esterify ricinoleic acid with oleyl alcohol and then acylate with oleic acid and thus produce an ester of a monohydric alcohol in which 3 oxirane rings could be introduced. However, as previously noted, for various reasons and particularly for economy and simplicity of reaction our preference is to use esters such as the butyl ester of soybean fatty acid, the amyl ester of soybean fatty acid, etc.

The epoxidation of ethylenic compounds and particularly esters of unsaturated fatty acids, unsaturated aliphatic alcohols, and the unsaturated fatty acids themselves, is well known. For instance, it has been described in the following patents:

U.S. Patents Nos.

| | |
|---|---|
| 2,443,280 | 2,556,145 |
| 2,445,892 | 2,567,237 |
| 2,457,328 | 2,567,930 |
| 2,458,484 | 2,569,502 |
| 2,485,160 | 2,661,367 |
| 2,487,829 | 2,686,805 |
| 2,510,905 | 2,692,271 |

If the fatty acid group has some other functional group present, difficulty may be involved in obtaining optimum yields for some reason that is not entirely clear. This would apply, for example, to castor oil, and ricinoleic acid esters. On the other hand, if castor oil is reacted with a low molal acid such as acetic acid, propionic acid, or the like, then these difficulties appear to be eliminated. There also appears to be difficulty in obtaining suitable yields in the case of conjugated unsaturation. In some instances where the unsaturation is not conjugated there is indication that there may be a shift during reaction to produce conjugation. In other words, in the epoxidation of the fatty acid or fatty acid ester or the like, if the fatty acid is polyethylenic it is very important that the ethylenic radicals be non-conjugated. The fatty acids themselves may contain 8 to 22 carbon atoms. The best example of the monoethylenic acid is, of course, oleic acid and perhaps erucic acid. Both are readily available as glycerides. As to the polyethylenic acids, particular attention is directed to linoleic. As to an example of an acid having 3 ethylenic linkages attention is directed to linolenic. These acids, of course, are available in the form of glycerides, particularly mixed glycerides. Other polyethenoic acids are obtained from oils of aquatic origin.

The present invention is concerned with the epoxidation products of esters derived from monohydric alcohols such as methyl alcohol, ethyl alcohol, propyl alcohol, butyl alcohol, amyl alcohol, hexyl alcohol, allyl, etc. The alcohols may be cyclic as in the case of benzyl alcohol, cyclohexanol, furfuryl, etc. The alcohols are characterized by having less than 8 uninterrupted carbon atoms and generally less than 8 carbon atoms in the alcohol without any limitation whatsoever. The various unsaturated acids previously described, monoethylenic or polyethylenic, can be converted into the corresponding esters by conventional methods. In fact, esters of soyabean fatty acids are available commercially as well as esters of various other unsaturated acids, for instance, ricinoleic acid. The esters generally available are methyl, ethyl, propyl, and butyl. Needless to say, when the monohydric alcohol esters are derived from mixed fatty acid glycerides, the esters themselves represent a cogeneric mixture.

PART 2

Section 1

The polyamines which may be employed as reactants fall within two types. The first type is characterized by the fact that the polyamines have at least one primary amino radical separated from another primary or secondary amino radical by two to three carbon atoms in a single chain. These polyamines under certain conditions can form cyclic amidines and thus are important from what is said in Part 5, subsequently.

One may use polyamines corresponding to the formula

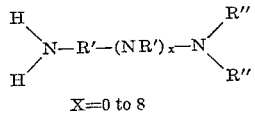

X=0 to 8 in which R'' is hydrogen, alkyl, cycloalkyl, aryl, or aralkyl and R' is a divalent radical such as —CH₂CH₂—

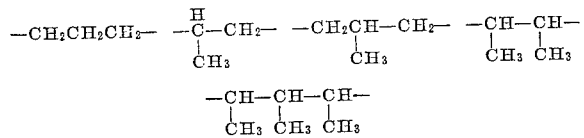

Stated another way, the polyamines have at least one primary amino group separated from another primary or secondary amino group by 2 to 4 carbon atoms. Examples of suitable amines include:

Ethylenediamine
Diethylenetriamine
Triethylenetetramine
Tetraethylenepentamine
Propylenediamine
Dipropylenetriamine
Tripropylenetetramine
Butylenediamine
Aminoethylpropylenediamine
Aminoethylbutylenediamine $$C_{17}H_{33}\text{—}\overset{H}{N}\text{—}C_3H_6\text{—}NH_2$$

Other polyamines in which the nitrogen atoms are separated by a carbon atom chain having 4 or more carbon atoms include the following: Tetramethylenediamine, pentamethylenediamine, and especially hexamethylenediamine. The latter is of particular interest because the product is commercially available in light of its use in the manufacture of synthetic fibre.

If desired, one can prepare a variety of reactants having two or more amino groups and at least one hydroxyl group. One may use modifications of procedures or the produces themselves as described in U.S. Patents Nos. 2,046,720 dated July 7, 1936, to Bottoms; 2,048,990 dated July 28, 1936 to Britton et al.; 2,447,821 dated August 24, 1948 to Sankus; and 1,985,885 dated January 1, 1935, to Bottoms. Examples include the following:

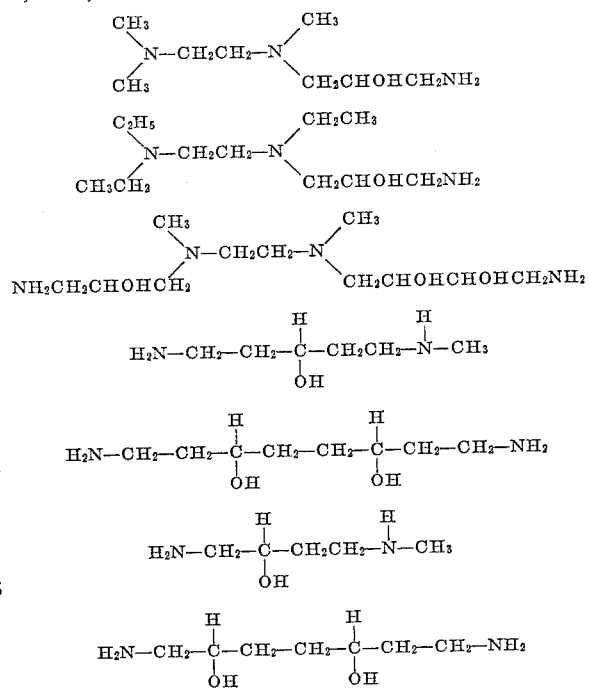

Other suitable amines are exemplified by ethylenebisoxypropylamine.

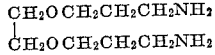

and derivatives obtained by treating ethylenebisoxypropylamine with 1, 2, 3 or 4 moles of ethylene oxide, propylene oxide, butylene oxide, or the like.

Other compounds including those having cyclic structures include piperazine, and the corresponding derivatives obtained by treating piperazine with alkylene oxides. The same applies to substituted piperazine such as the 2,5-dimethylpiperazine.

As to mono-substituted dialkanol piperazine see U.S. Patent No. 2,421,707, dated June 3, 1947, to Malkemus.

PART 2

Section 2

Another example of polyamine which may be employed as a reactant is the kind described as "Duomeens."

TABLE 1

Duomeen is a trademark designation for certain diamines made by Armour Chemical Division, Armour & Company, Chicago, Illinois. The Duomeens have the following general formula:

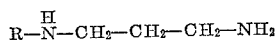

R is an alkyl group derived from a fatty acid or from the mixed fatty acids as obtained from certain oils. The specific Duomeen and the source of the radical R are as follows:

(1) Duomeen 12    R=lauric
(2) Duomeen C     R=coconut oil fatty acid
(3) Similarly, a comparable diamine, presumably obtained from Rosin Amine D and acrylonitrile, is obtainable from Hercules Power Company, Wilmington, Delaware. The composition of Rosin Amine D is as follows:

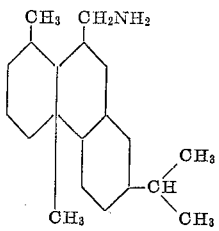

Polyamines from monoamines and cyclic imines, such as ethylene imine.

(4) $C_8H_{17}-\overset{H}{N}-CH_2CH_2-NH_2$
N-octyl ethylenediamine (5) $C_{14}H_{29}-\overset{H}{N}-CH_2CH_2-NH_2$
N-tetradecyl ethylenediamine (6) $C_{16}H_{33}-\overset{H}{N}-CH_2-CH_2-NH_2$
N-hexadecylethylenediamine (7) $C_{12}H_{25}-\overset{H}{N}-C_2H_4-\overset{H}{N}-C_2H_4-\overset{H}{N}-C_2H_4-NH_2$
N-dodecyl triethylenetetramine (8) $C_{12}H_{25}-\overset{H}{N}-C_3H_6-NH_2$
N-dodecyl propylenediamine (9) $C_{10}H_{21}-\overset{H}{N}-C_4H_8-NH_2$
N-decylbutylenediamine

(10) Polyamines containing tertiary amino groups:

(11) $C_{12}H_{25}N-C_3H_6-\overset{C_2H_5}{\underset{|}{N}}-C_2H_5$ (with H on first N)

It is to be noted that all the above examples show high molal groups, i.e., 8 carbon atoms or more. The same derivatives in which methyl, ethyl, propyl, butyl, amyl, hexyl groups, or the like, appear instead of octyl decyl, etc., are equally satisfactory.

PART 2

Section 3

Polyamines of the kind described above, i.e. those having at least one primary amino radical separated from another primary or secondary amino radical by two to three carbon atoms in a single chain, can be converted into a number of products which in turn still have the characteristic requirements previously noted, i.e., are still oxyalkylation susceptible. A good example is a cyclic amidine obtained from a polyamine. This may be illustrated by the following table:

TABLE 2

(1) 2-undecylimidazoline ($C_{11}H_{23}$)

(2) 2-heptadecylimidazoline ($C_{17}H_{35}$)

(3) 2-oleylimidazoline ($C_{17}H_{33}$)

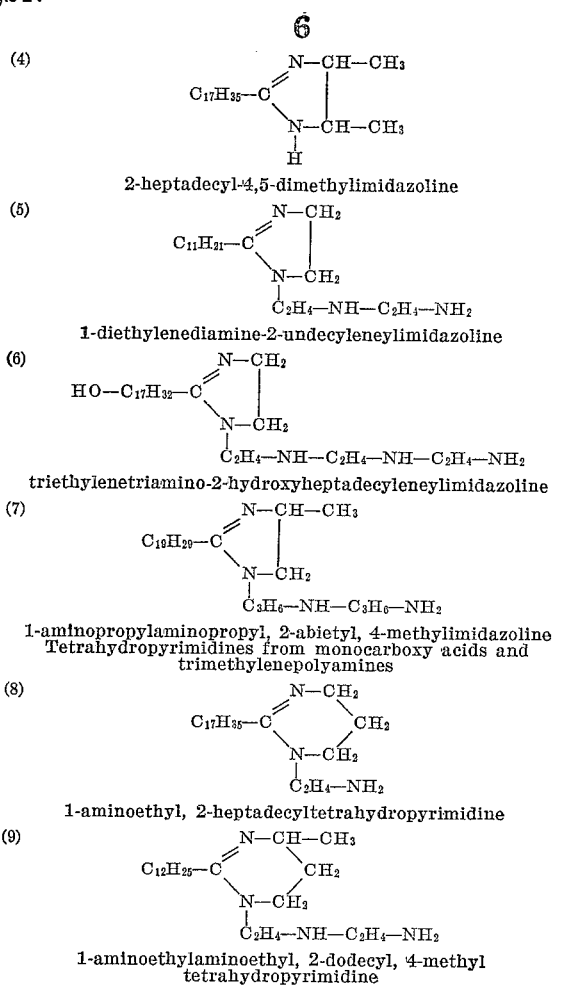

(4) 2-heptadecyl-4,5-dimethylimidazoline (5) 1-diethylenediamine-2-undecyleneylimidazoline (6) triethylenetriamino-2-hydroxyheptadecyleneylimidazoline (7) 1-aminopropylaminopropyl, 2-abietyl, 4-methylimidazoline Tetrahydropyrimidines from monocarboxy acids and trimethylenepolyamines (8) 1-aminoethyl, 2-heptadecyltetrahydropyrimidine (9) 1-aminoethylaminoethyl, 2-dodecyl, 4-methyl tetrahydropyrimidine Cyclic amidines are derived conveniently from carboxy acids, including polycarboxy acids. As is well known, some polycarboxy acids have 3 or more carboxyl radicals; thus, it is possible to obtain cyclic amidines in which 3 or more ring radicals appear. The present invention, however, is limited to cyclic amidines having not over 2 ring radicals and preferably only one ring radical.

In the hereto appended claims the cyclic amidines having a single ring radical will be referred to by such terminology. Cyclic amidines having more than one ring radical are illustrated by the following formulas:

(10) 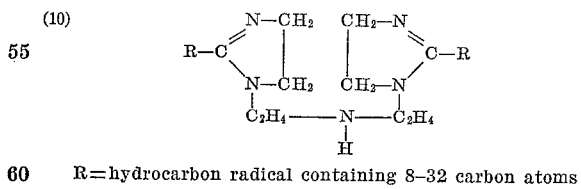

R=hydrocarbon radical containing 8–32 carbon atoms cyclic amidines containing basic tertiary amino groups.

(11) 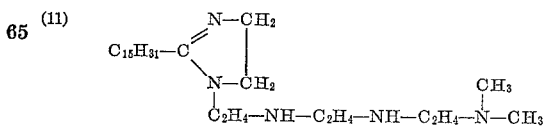

It is to be noted that all the above examples show high molal groups, i.e., 8 carbon atoms or more. The same derivatives in which methyl, ethyl, propyl, butyl, amyl, hexyl groups, or the like, appear instead of groups having 11, 12, 17 or 19 carbon atoms, are equally satisfactory.

PART 2
Section 4

Actually, cyclic amidines of the kind described previously are obtained in many instances from amides as intermediates in amidine manufacture. Suitable amides derived from amines of the kind described previously are suitable as reactants for the present purpose. Such amides are shown in the following table:

TABLE 3

(1)
$$C_{17}H_{35}-\overset{O}{\overset{\|}{C}}-\overset{H}{N}-C_2H_4-NH_2$$
aminoethylstearamide (2)
$$C_{17}H_{33}-\overset{O}{\overset{\|}{C}}-\overset{H}{N}-C_2H_4-\overset{H}{N}-C_2H_4-NH_2$$
aminoethylaminoethyloleamide (3)
$$C_9H_{19}-\overset{O}{\overset{\|}{C}}-\overset{H}{N}-C_3H_6-\overset{H}{N}-C_3H_6-NH_2$$
aminopropylaminopropyldecanoamide (4)
$$C_{15}H_{31}-\overset{O}{\overset{\|}{C}}-\overset{H}{N}-C_4H_8-\overset{H}{N}-C_2H_4-\overset{H}{N}-C_2H_4-NH_2$$
aminoethylaminoethylaminobutylpalmitamide (5)
$$C_{19}H_{29}-\overset{O}{\overset{\|}{C}}-\overset{H}{N}-CH_2-CH_2-NH_2$$
aminoethyl abietamide (6)
$$C_{19}H_{29}-\overset{O}{\overset{\|}{C}}-\overset{H}{N}-C_3H_6-NH_2$$
aminopropylabietamide (7)
$$C_{17}H_{33}-\overset{O}{\overset{\|}{C}}-\overset{H}{N}-C_3H_6-\overset{H}{N}-C_2H_4-NH_2$$
aminoethylaminopropyloleamide Diamides may be obtained from polyamines and 2 moles of acid.

(8)
$$C_7H_{15}\overset{O}{\overset{\|}{C}}-\overset{H}{N}-C_2H_4-\overset{H}{N}-C_2H_4-\overset{H}{N}-\overset{O}{\overset{\|}{C}}-C_7H_{15}$$
diethylenetriamine dicaprylamide (9)
$$C_{17}H_{35}-\overset{O}{\overset{\|}{C}}-\overset{H}{N}-C_3H_6-\overset{H}{N}-\overset{O}{\overset{\|}{C}}-C_{17}H_{35}$$
propylenediamine distearamide Polyamides are derived from polycarboxy acids as well as monocarboxy acids. Thus it is possible to get polyamides by using acids containing more than one carboxyl group, as illustrated in the following examples:

(10)
$$H_2N-C_2H_4-\overset{H}{N}-\overset{O}{\overset{\|}{C}}-R-\overset{O}{\overset{\|}{C}}-\overset{H}{N}-C_2H_4-NH_2$$

R—(COOH)₂ = Emery dimeric acid available commercially and said to be dilinoleic acid

(11)
$$H_2N-C_2H_4-\overset{H}{N}-\overset{O}{\overset{\|}{C}}-(CH_2)_8-\overset{O}{\overset{\|}{C}}-\overset{H}{N}-C_2H_4-NH_2$$

In the hereto appended claims, the amides having a single amide group will be referred to by such terminology.

Amino amides can be obtained from polyamides in which there is a terminal tertiary amine radical having a basic nitrogen atom. Another procedure involves the production of an amino amide from a polyamine in which the terminal radicals are either primary or secondary followed by alkylation of the amide so as to convert the residual terminal radical into a basic tertiary amine radical. Another procedure is to use a secondary amine, such as dibutylamine or dihexylamine, and react stepwise with ethylene imine or propylene imine. The polyamine so obtained contains a basic tertiary amino radical. The acylation of such a polyamine results in an amino amide which will form complexes comparable to those obtained from a basic tertiary amine. Examples of such amino amides are as follows:

(12)
$$C_{17}H_{33}-\overset{O}{\overset{\|}{C}}-\overset{H}{N}-C_2H_4-\overset{H}{N}-C_2H_4-\overset{CH_3}{\overset{|}{N}}-CH_3$$

(13)
$$C_{11}H_{23}-\overset{O}{\overset{\|}{C}}-\overset{H}{N}-C_3H_6-\overset{H}{N}-C_2H_4-\overset{CH_3}{\overset{|}{N}}-CH_3$$

It is to be noted that all the above examples show high molal groups, i.e., 7 carbon atoms or more. The same derivatives in which methyl, ethyl, propyl, amyl, butyl, hexyl groups, or the like, appear instead of groups having 9, 17, 19 carbon atoms or the like, are equally satisfactory.

PART 2
Section 5

One type of hybrid compound includes either an imidazoline ring or a tetrahydropyrimidine ring. Since it is more economical to use the imidazolines rather than the tetrahydropyrimidines this particular type will be illustrated but it is understood that either type can be used. One example is an instance in which the imidazoline radical appears, and also a high molal radical, for instance, a $C_{13}H_{17}$ radical. In this instance there are two high molal groups:

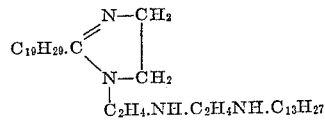

Actually a cyclic amidine having a hydroxy alkyl group may be esterified, provided that there is still a reactive hydrogen atom for combination with the epoxidized compound. This is illustrated by the following:

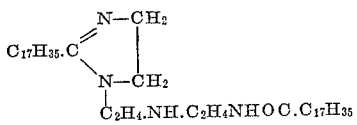

The type in which there is an imidazoline ring and only one high molal amino group is illustrated in the following:

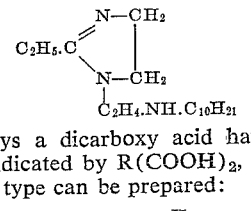

If one employs a dicarboxy acid having 8 or more carbon atoms indicated by R(COOH)₂, then compounds of the following type can be prepared:

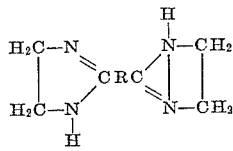

It is obvious that a high molal amine such as N-dodecyl diethylenetriamine having the formula $$C_{12}H_{25}-\overset{H}{N}-CH_2CH_2-\overset{H}{N}-CH_2-CH_2-NH_2$$

can be converted into an amide by reaction with a low molal acid, such as acetic acid or a high molal acid, such as oleic acid. Such compounds can be illustrated by the following:

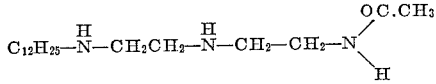

or

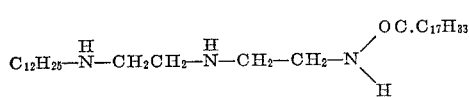

Similarly, if the dodecyl diethylene triamine is treated with a mole of ethylene oxide or preferably 2 moles of ethylene oxide so as to have a terminal radical, thus:

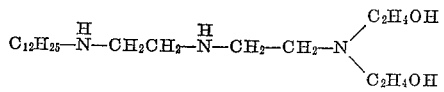

it becomes obvious that an ester can be formed from either acetic acid or oleic acid as illustrated by the following:

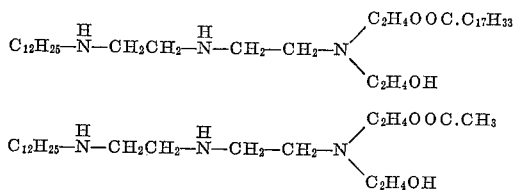

Needless to say, a compound such as dodecyl diethylene triamine previously illustrated can be converted into an imidazoline by conventional procedure, such a procedure already has been described above. The imidazoline may be derived from either a low molal acid, i.e. acetic acid, or a high molal acid, such as oleic acid.

Similarly, an amine of the following type:

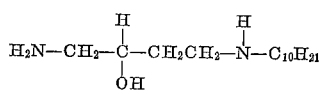

can be converted into an oxazoline by using either a low molal monocarboxy acid or a high molal monocarboxy acid; or if the $C_{10}H_{21}$ radical above is replaced by a $CH_3$ radical suitable compounds are obtained using a higher fatty acid, such as oleic acid.

Such compounds can be illustrated by the following:

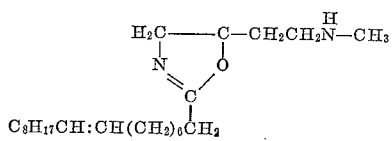

The introduction of a pent-oxazoline group requires the use of a reactant such as the following:

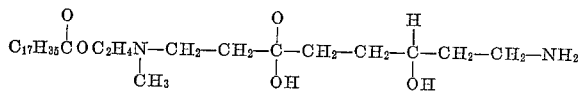

The previous examples seem to be more than ample for purpose of illustration. It is to be noted that combinations in which at least three different types of radicals appear are readily obtainable by reacting an imidazoline obtained from a tetramine or pentamine with an acid, such as acetic acid or oleic acid so as to yield an amido imidazoline and then react such product with a glycidyl ether of the type

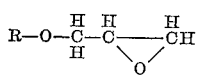

in which R represents a low or high molal group. Similarly, an imidazoline may be subjected to oxyalkylation and then to esterification followed by the use of a glycidyl ether of the kind above described.

Likewise, another type of reactant is represented by compounds of the following structure which have been described in the patent literature

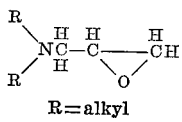

R=alkyl

See Journal of the American Chemical Society, volume 68 (1946), page 1291.

Compounds containing the oxazoline ring or pentoxazoline ring and derived from a dicarboxy acid can employ the carboxyl radical so as to combine to form an imidazoline ring as previously described, or obviously to combine with an amine to form an amide group, or with a polyamine to form not only an amide group but also a compound which again can be reacted with an aminoglycidyl ether as above described to introduce a high molal group. Furthermore, such carboxyl group could be esterified with triethanolamine or the like, or with a comparable polyamine to produce an amino ester.

Attention is directed to the fact that a compound such as N-octadecyl N,N',N' tris-2-hydroxyethyl-1,3-trimethylene diamine having the following formula

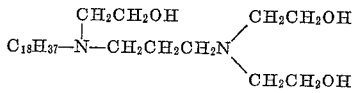

can be esterified with acetic acid or oleic acid to introduce an amino ester radical. Similarly, the amino ester so derived can be reacted in turn with an alkylene imine such as ethylene imine or propylene imine and then reacted with another mole of acid so as to introduce a third type, to wit, an amido type radical.

PART 2

Section 6

An interesting group of compounds which have been noted previously are the non-cyclic amidines having the general formula

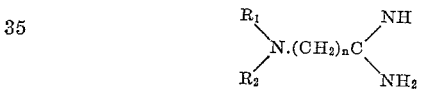

where $R_1$ and $R_2$ are either or both an alkyl group or hydrogen, and $n$, an integer from 7 to 13. See British Patent 518,575.

Specific examples described in said British patent include the following:

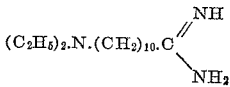

kappa-diethylamino-n-undecane amidine

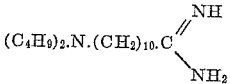

kappa-dibutylamino-n-undecane amidine

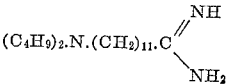

lambda-dibutylamino-n-dodecane amidine

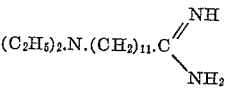

lambda-diethylamino-n-dodecane amidine

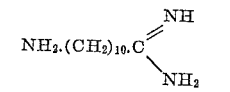

kappa-amino-n-undecane amidine

Other suitable polyamino compounds which form salts or salt complexes as herein described, may contain acyl radicals or an acyl radical residue from low molal monocarboxy acids as, for example, acetic acid, propionic acid, butyric acid, hydroxyacetic acid, lactic acid, etc. This applies not only to cyclic amidines but also other compounds such as high molal polyamines, esters of hydroxylated polyamines, etc. Purely by way of example attention is directed to the following formulas which illustrate such compounds:

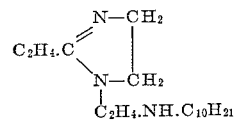

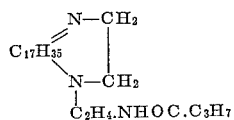

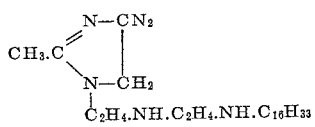

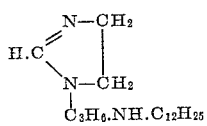

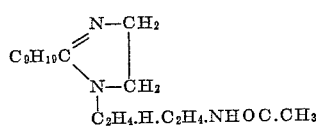

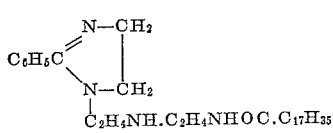

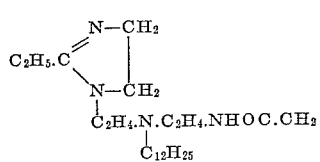

Needless to say, the same comparable compounds can be obtained from another type of cyclic amidine, to wit, a tetrahydropyrimidine.

Other examples suitable for the present purpose are obtained by reacting high molal diamines of the formula

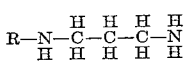

where R varies from 8 to 18 and particularly from 12 to 18, with a single mole of low molal monocarboxy acid such as acetic acid, propionic acid, butyric acid, etc.

PART 2

Section 7

In many instances monoamines can be reacted with ethylene imine, propylene imine, or a dialkyl aminoepoxypropane such as

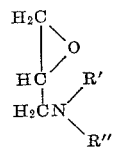

wherein R' and R'' are alkyl groups, to convert a monoamine compound into a polyamino compound. This can be illustrated by suitable polyamino compounds having an oxazoline ring (5-membered or 6-membered).

TABLE 5

General Reaction:

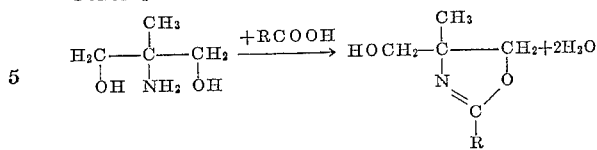

2 amino-2-methyl-1,3-propanediol
R = alkyl

Stearic acid $CH_3(CH_2)_{16}COOH$

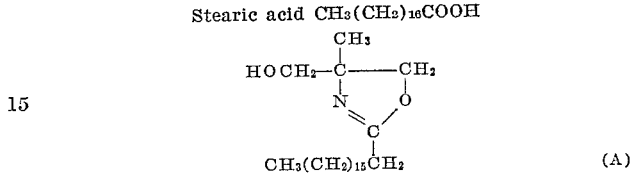 (A)

Oleic Acid $C_8H_{17}CH{:}CH(CH_2)_7COOH$

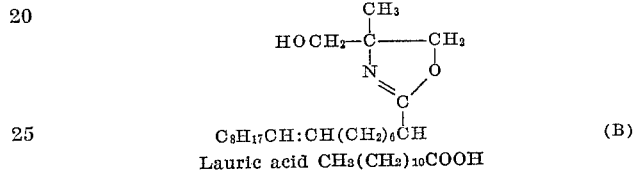 (B)

Lauric acid $CH_3(CH_2)_{10}COOH$

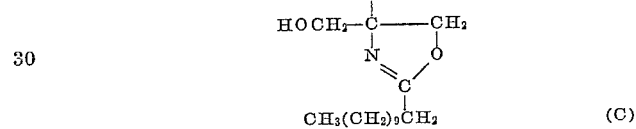 (C)

Let $R_1OH$ be the simplified structure for all the four hydroxyethyl oxazolines.

General Reaction:

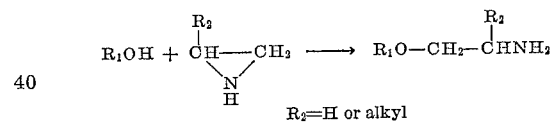

$R_2$ = H or alkyl (1) (A) + ethylene imine

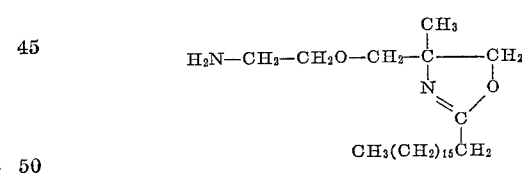

(2) (B) + ethylene imine

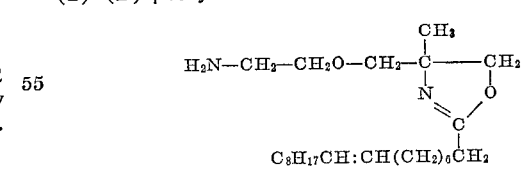

(3) (C) + ethylene imine

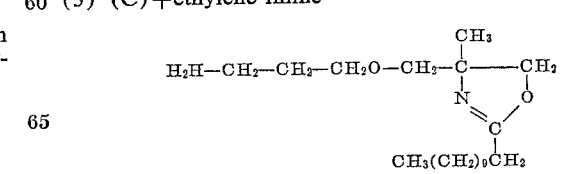

(4) (A) + propylene imine

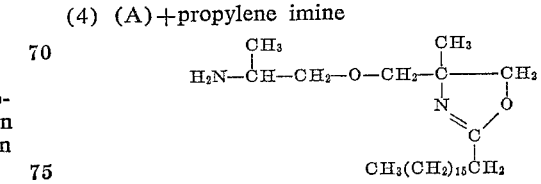

(5) (B)+propylene imine

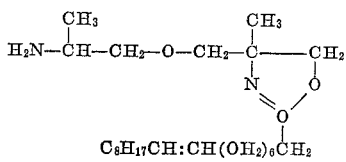

General Reaction:

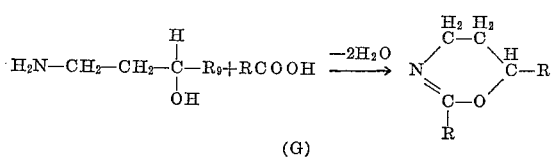

(6) (G)+RCOOH where R=C₁₁H₂₃   R₉=CH₂CH₂-C(H)(OH)-CH₂CH₂NH₂

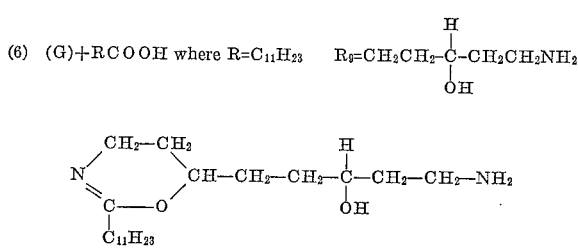

PART 2

Section 8

In co-pending application, Serial No. 521,387, filed July 11, 1955, of Kwan-Ting Shen, there is described an apparently new class of materials, to wit, disubstituted cyclic amidines of the class of tetrahydropyrimidines and amino-imidazolines of the structure

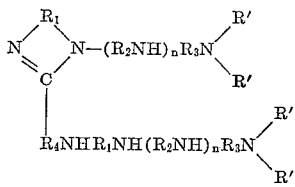

$R_1$, $R_2$, and $R_3$ are divalent hydrocarbon radicals containing at least 2 and not more than 3 carbon atoms in the straight chain; $R_4$ is the radical of an alpha-beta unsaturated acid having not over 18 carbon atoms and obtained by the elimination of the 2 carboxyl oxygen atoms; R is selected from the class of hydrogen atom and hydroxyl alkyl radicals having not over 4 carbon atoms, and $n$ is an integer including zero; and

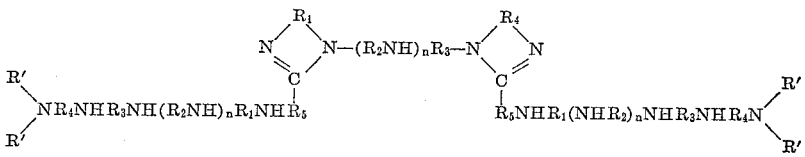

in which $R_4$ is a divalent radical, $R_5$ is derived from an alpha-beta unsaturated acid, and the other symbols have their prior significance.

These materials are obtained by reaction between polyamines such as the polyethylene amines previously described, i.e., triethylene tetramine, tetraethylene pentamine, etc., and certain alpha-beta unsaturated acids such as acrylic acid, crotonic acid, methacrylic acid, agelic acid, and sorbic acid.

It will be noted one can also prepare such products from nondistillable polyethylene amines, for instance, the residual mixture in polyethylene manufacture which consists largely of pentaethylene hexamine or hexaethylene heptamine. Using such high amino compounds having, for instance, 6 or 7 nitrogen atoms per molecule one can obtain reactants which have as many as 20 nitrogen atoms in the molecule. Similarly, one can react dicarboxy or tricarboxy acids with 2 or 3 moles of the same polyamines having 5, 6 or 7 nitrogen atoms and obtain amides, polyamides or combinations in which cyclic amidine groups also appear and which may likewise have as many as 10 to 20 nitrogen atoms per molecule. In a general way, compounds of the types just referred to having up to 20 nitrogen atoms per molecule represent a practical upper limit in many cases.

PART 2

Section 9

Said aforementioned co-pending Shen application, Serial No. 521,387, filed July 11, 1955, now Patent No. 2,819,284, also describes another class of material which can be used as reactants in the present invention, to wit, a somewhat analogous class of disubstituted cyclic amidines has been illustrated in which one substituent does not necessarily have a nitrogen atom. This is an instance of the kind in which hydroxyethyl ethylene diamine, hydroxypropyl ethylene diamine, hydroxybutyl ethylene diamine, hydroxyethyl 1,3-propylene diamine hydroxylpropyl 1,3-propylene diamine, hydroxybutyl 1,3-propylene diamine, or the like, are used to give a type of compound previously illustrated to wit,

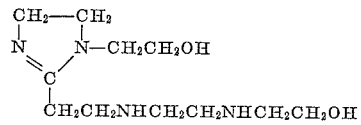

Furthermore, the precursory diamines of the kind referred to above can be reacted with other alkylene oxides such as glycide, methyl glycide, allyl glycidyl ether, glycidyl isopropyl ether, glycidyl phenyl ether, styrene oxide, etc., on a mole-for-mole basis. The resultant of such reaction can be used in the same manner as the substituted diamines above noted.

The type of compounds described in aforementioned Shen application, Serial No. 521,387, filed July 11, 1955, now Patent No. 2,819,284 are particularly valuable as reactants for the reason that either the class of materials described in Section Eight, preceding, or in the present section, can be prepared free from any high molal group or a group which has at least 8 uninterrupted carbon atoms. Therefore, particularly valuable products are obtained by combination with the epoxidized products herein described which in turn supply a high molal group.

Attention is again directed to the fact that the polynitrogenous reactants preferably contain at least one basic nitrogen and preferably two or more. Furthermore, it is preferably that there be present at least one, and preferably two, primary amino groups. If one reacts ethylene diamine, diethylene triamine, triethylene tetramine, tetraethylene pentamine, or the like with 2 moles of a low molal acid such as acetic acid, propionic acid, butyric acid, or with a higher fatty acid such as oleic acid or stearic acid, or a combination of the two, one can obtain a compound having 2 amido radicals in which there is no basic nitrogen atom. If one uses one mole of an acid there is a single basic nitrogen atom. Our preference, however, is to use compounds in which there are at least 2 basic nitrogen atoms and preferably having at least 2 basic primary amino groups. For this reason the preference in many instances is to employ polyamines such as diethylene triamine, triethylene tetramine, tetraethylene pentamine, etc. In a large number of the examples which have appeared in the sections preceding, the compounds illustrated have high molal radicals, for instance, one having 8 to 18 carbon atoms. It is again desirable to point out that this is no limitation to the broad aspect of the invention. In each instance such high molal radicals can be replaced by a methyl group, ethyl group, propyl group, butyl group, amyl group, hexyl group, heptyl group, or the like.

Phenylenediamine represents an example of a polyamine which contributes substantially no basicity to the product of reaction.

PART 2

Section 9

Another type of compound which may be reacted with the epoxidized derivatives are the hydrazine derivatives of the kind which have been described in the art such as betahydroxyethyl hydrazine which is commercially available.

Other compounds which may be employed are those which correspond to the formula

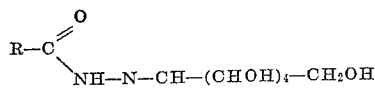

The acyl radical RCO can be derived from a low molal acid or a high molal acid such as stearic acid.

See also U.S. Patent No. 2,371,133 which describes hydrazine derivatives containing hydroxyalkyl radicals which are obtained by condensing one mol of a hydrazide of an aliphatic carboxylic acid containing at least 2 carbon atoms, which hydrazide contains at least one hydrogen atom bound to a hydrazine nitrogen atom with at least one mol of an alkylating agent which is capable of introducing an aliphatic radical containing the grouping —C—C— and also hydroxyl groups.

As to the manufacture of 2-hydroxyethyl hydrazine see U.S. Patent No. 2,660,607 dated November 24, 1953, to Gever et al.

Note also that low polymers of hydrazine or similar compounds, such as polymethylene dihydrazines of the formula $H_2N.NH.(CH_2)_n.NH.NH_2$ may be employed as a reactant with the epoxidized derivatives. For further description of such polymethylene dihydrazines see U.S. Patent No. 2,445,518 dated July 20, 1948 to Dreyfus.

PART 3

Part 3 is concerned with the reaction between the two classes of reactants described in the foregoing, i.e., those described in Parts 1 and 2. For purpose of brevity we are going to limit the examples to products which are available commercially or can be obtained from suppliers of epoxidized products. These products are epoxybutyl stearate, isobutylepoxyacetoxy stearate, and methylepoxy soyate.

As previously pointed out the reaction involving the reactant containing the oxirane ring and the selected compound having a labile hydrogen atom is essentially a variety of oxyalkylation. For this reason the reactions are so conducted. The procedure is simpler than is the case when ethylene oxide or propylene oxide is used for the reason that the reactants are non-volatile as a rule and thus one does not have to use an autoclave or similar equipment. Furthermore, many of the reactants employed are basic in character and thus to the extent required act as their own catalyst. As has been pointed out elsewhere catalysts can be added, particularly alkaline catalysts such as sodium methylate, caustic soda, caustic potash, etc. In a general way, the procedure employed in preparing the reactants is the same and the only precaution taken as a rule is to avoid temperatures above that required to rupture the oxirane ring for the reason that side reactions or secondary reactions may take place. The procedure is illustrated by Examples 1a and 13a, and then by Tables 6, 7, 8, and 9, which present the data covering the preparation of a wide variety of products from the reactants described previously.

EXAMPLE 1a

A 300 ml. three-necked flask was fitted with a reflux condenser, a thermometer, and an efficient sealed stirrer. In the flask was placed 184 grams of epoxybutyl stearate. This was obtained from the butyl ester of soyabean fatty acid and is sometimes marketed under the name of butylsoyate. To this there was added 91 grams of sorbitol along with 1.4 grams of sodium methylate as a catalyst. The mixture was first stirred for about 15 minutes to assure even distribution and then heat was applied. The mixture was held to 120° C. for about 3 hours. The product was a yellow very viscous mass and showed definite hydrotropic or surface-active properties.

EXAMPLE 13a

In the same equipment as used in Example 1a, 175 grams of the epoxbutyl stearate were used along with 49 grams of diethylene triamine. No added catalyst was employed. The reaction took place readily at 110° C., the time required was 3 hours. The final product was a brown liquid, soluble in both xylene and isopropanol and having definite surface active properties.

TABLE 6

| Ex. No. | Oxirane ring containing reactant | Amt., gms. | Oxyalkylation susceptible reactant | Amt., gms. | Catalyst, sodium methylate, gms. | Temp., °C. | Time, hrs. | Product of reaction |
|---|---|---|---|---|---|---|---|---|
| 1a | Epoxy butyl stearate | 60 | Dimeric acid diimidazoline | 178 | | 125 | 3 | Black semi-solid sol. in xylene. |
| 2a | ----do---- | 184 | Aminoethyl stearamide | 155 | | 110 / 150 | 3 / 0.5 | Dk. brn. visc. liq. sol. in alcohol and xylene. |
| 3a | ----do---- | 184 | Bisimidazoline from diglycolic acid. | 68 | 1.7 | 120 / 160 | 2 / 2 | Blk. viscous liq. sol. in alcohol and xylene. |
| 4a | ----do---- | 175 | Ethylene diamine | 35 | | 110 | 3 | Brn. liq., sol. in xylene and isopropanol. |
| 5a | ----do---- | 175 | Diethylene triamine | 49 | | 110 | 3 | Do. |
| 6a | ----do---- | 150 | Triethylene tetramine | 59.5 | | 110 | 3 | Do. |
| 7a | ----do---- | 175 | Tetraethylene pentamine | 90 | | 110 | 3 | Brn. liq. sol. in xylene, isopropanol and water. |
| 8a | ----do---- | 150 | Propylene diamine | 30.2 | | 110 | 3 | Do. |
| 9a | ----do---- | 150 | Propylene triamine | 36.2 | | 110 | 3 | Brn. liq. sol. in xylene and isopropanol. |
| 10a | ----do---- | 150 | Duomeen S | 164.0 | | 130 | 3 | Lt. brn. semi-solid. Sol. in xylene and isopropanol. |
| 11a | ----do---- | 150 | Hydroxy-ethyl ethylene diamine. | 428 | | 115 | 3 | Lt. brn. liq., sol. in xylene and isopropanol. |

TABLE 7

| Ex. No. | Oxirane ring containing reactant | Amt., gms. | Oxyalkylation susceptible reactant | Amt., gms. | Catalyst, sodium methylate, gms. | Temp., °C. | Time, hrs. | Product of reaction |
|---|---|---|---|---|---|---|---|---|
| 12a | Isobutylepoxyacetoxy stearate. | 241 | 1,5 hexanediamine | 60.5 | -------- | 115 | 3 | Brn. liq. sol. in xylene and alcohol. |
| 13a | ----do---- | 241 | m-Phenylene diamine | 44.0 | -------- | 120<br>160 | 2<br>2 | Black visc. liq., sol. in xylene and alcohol. |

TABLE 8

| Ex. No. | Oxirane ring containing reactant | Amt., gms. | Oxyalkylation susceptible reactant | Amt., gms. | Catalyst, sodium methylate, gms. | Temp., °C. | Time, hrs. | Product of reaction |
|---|---|---|---|---|---|---|---|---|
| 14a | Methyl epoxysoyate [1] | 150 | Ethylene diamine (78%) | 38 | -------- | 120<br>150 | 2<br>0.5 | Brn. vis. liq., sol. in xylene and isopropanol. |
| 15a | ----do---- | 150 | Propylene diamine | 37 | -------- | 120<br>150 | 1.5<br>0.5 | Drk. brn. vis. liq., sol. in xylene and alcohol. |
| 16a | ----do---- | 150 | m-Phenylene diamine | 54 | -------- | 120<br>165 | 2<br>2 | Drk. brn. very vis-liq., sol in xylene and alcohol. |
| 17a | ----do---- | 150 | Hydroxyethyl ethylene diamine. | 53 | -------- | 105<br>130 | 3<br>0.5 | Yel. vis. liq. xylene and isopropanol, soluble. |

[1] Methyl epoxysoyate—Epoxidized methyl ester of soyabean fatty acid.

Dimeric Acid Diimidazoline is the reaction product of two moles of triethylene tetramine and one mole of Emery Dimeric acid. Emery Dimeric acid is dimerized linoleic acid produced by the Emery Industries, Incorporated.

Duomeen S is an amino propyl alkylamine, $$RNHC_3H_6NH_2$$

derived from soyafatty acid. It is a product of Armour Chemical Company.

PART 4

As previously pointed out, a large proportion of the products described in Part 3 have one or more basic nitrolen atoms. Thus it is possible to add a high molal acid or low molal acid so as to form a salt with the residual basicity. In a number of instances salt formation changes or alters the solubility of the free base in either oil or water and for a number of purposes makes the salt form more attractive. Where the base has a plurality of basic nitrogen atoms one can neutralize one or more as desired. Thus, the basic products of reaction can be reacted with low molal acids such as acetic acid, lactic acid, glycolic acid, propionic acid, diglycolic acid and the like. On the other hand one can use naphthenic acid, higher fatty acids, tall oil sulfonic acids, and particularly oil soluble petroleum sulfonic acids such as mahogany acids to form salts.

Table 9 immediately following shows combinations of products which appeared in prior tables combined with various acids illustrating what has been said in this part of the text.

TABLE 9

| Compound No. | Amt., gms. | Acid used | Amt., gms. | Isopropanol, gms. | Water, gms. | Solution concentration, percent |
|---|---|---|---|---|---|---|
| 1a | 50 | Glycolic | 3.8 | 52.6 | -------- | 50 |
| 2a | 50 | Lactic | 6.7 | 56.7 | -------- | 50 |
| 4a | 50 | Propionic | 8.4 | 30.0 | 28.4 | 50 |
| 7a | 50 | ----do---- | 13.2 | 30.0 | 33.2 | 50 |
| 10a | 50 | Diglycolic | 5.5 | 55.5 | -------- | 50 |
| 14a | 50 | Acetic | 6.8 | 30.0 | 26.8 | 50 |
| 15a | 50 | ----do---- | 6.7 | 30.0 | 26.7 | 50 |
| 16a | 50 | Glycolic | 11.7 | 30.0 | 24.7 | 50 |
| 5a | 50 | Adipic | 11.5 | 30.0 | 31.5 | 50 |
| 17a | 50 | Succinic | 7.2 | 30.0 | 27.2 | 50 |

PART 5

The products herein described fall into two classes; those which are basic by virtue of the presence of one or more basic nitrogen atoms and those which are not basic because the nitrogen atoms do not have significant basicity. Thus, what is said herein applies not only to compounds as such but also to those which are basic enough to form salts and also applies to the salts as described in Part 4, preceding. Such products and others herein described may all be used for the resolution of petroleum emulsions of the water-in-oil type. The products without further reaction are particularly valuable as additives for lubricating oils which are derived from sources other than petroleum.

As to specific uses for the herein described compounds including the various salts it is to be noted such compounds are valuable as a fuel oil additive in the manner described in U.S. Patent 2,553,183, dated May 15, 1951, to Caron et al. It can be used in substantially the same proportions or lower proportions and this is particularly true, when used in conjunction with a glyoxalidine or amido glyoxalidine.

An analogous use in which these products are equally satisfactory, is that described in U.S. Patent No. 2,665,978, dated January 12, 1954, to Stayner et al. The amount employed is in the same proportion or lesser amounts than referred to in said aforementioned Caron et al. patent.

The second use is for the purpose of inhibiting fogs in hydrocarbon products as described in U.S. Patents No. 2,550,981 and 2,550,982, both dated May 1, 1951, and both to Eberz. Here again it can be used in the same proportions as herein indicated or even smaller proportions, A third use is to replace oil soluble petroleum sulfonates so-called mahogany soaps, in the preparation of certain emulsions, or soluble oils or emulsifiable lubricants where such mahogany soaps are employed. The cogeneric mixtures having this peculiar property serve to replace all or a substantial part of the mahogany soap.

Another use is where the product does not serve as an emulsifying agent alone but serves as an adjunct.

Briefly stated, the fourth use is concerned with use as a coupling agent to be employed with an emulsifying agent. See "The Composition and Structure of Technical Emulsions," J. H. Goodey, Roy. Australian Chem. Inst. J. & Proc., vol. 16, 1949, pp. 47–75. As stated, in the summary of this article, it states:

"The technical oil-in-water emulsion is regarded as a system of four components: the dispersion medium, consisting of the highly polar substance water; the disperse phase composed of hydrocarbons or other substances of comparatively weak polarity; the coupling agent, being an oil-soluble substance involving an hydroxyl, carboxyl or similar polar group; and the emulsifying agent, which is a water-soluble substance involving an hydrocarbon radical attached to an ionizable group."

Fifth, these materials have particular utility in increasing the yield of an oil well by various procedures which in essence involve the fracturing of the strata by means of liquid pressure. A mixture of these products with oil or oil in combination with a gel former alone or a gel former and finely divided mineral particles, yields a product which, when it reaches crevices in the strata which are yielding water, forms a gelatinous mass of curdy precipitate or solid or semi-solid emulsion of a high viscosity. In any event, it represents a rapid sealing agent for the strata crevices and permits pressure to be applied to fracture the strata without loss of fluid through crevices, openings or the like.

Such compounds or derivatives also are effective for other purposes, such as an anti-fogging agent in motor fuels, a coagulation preventive in burner oils, and as an additive for the prevention of corrosion of ferrous metals. Such invention, however, is not part of what is herein claimed.

The herein described products and the derivatives thereof are particularly valuable in flooding processes for recovery of oil from subterranean oil-bearing strata when employed in the manner described in U.S. Patent No. 2,233,381, dated February 25, 1941, to De Groote and Keiser.

Furthermore, the herein described products may be employed to increase operating efficiency by increasing the oil-to-brine ratio or by increasing the total oil recovery in primary recovery operations as differentiated from secondary recovery operations. The procedures employed are essentially those as described in either U.S. Patent No. 2,331,594, dated October 12, 1943, to Blair, or U.S. Patent No. 2,465,237 dated March 22, 1949, to Larsen.

When the products of the kind herein described are used for water flooding and particularly in the form of salts, they have unusual value in a fresh water or brine system for the inhibition of the growth of both anaerobic and aerobic bacteria but are particularly applicable in controlling the sulfate reducing organisms which cause difficulty in secondary recovery operations. Thus, one may use some other agent or agents in water flood systems and use compounds as herein described primarily for reducing bacterial growth. The use of such industrial bactericide is well known and the procedure is conventional; for instance, one can use the methods described in an article entitled "The Role of Microorganisms" by R. C. Allred, which appeared in Producers Monthly, VI. 18, No. 4, pages 18–22.

Attention again is directed to the fact that in many cases the cogeneric mixtures herein described contain a significant or substantial amount of cyclic amidines or cyclic amidine derivatives. There is no intention of differentiating between the unneutralized product, the hydrate formed on combination with water, and the salts. As far as we have been able to determine in every instance the amount of cyclic amidine compounds or derivatives present represent approximately one-third or more, probably one-half or more, of the total cogeneric mass. In many instances probably two-thirds, or almost the entire cogeneric mass, is characterized by the cyclic amidine structure.

In the use of the herein described products as industrial bactericides and particularly in connection with water flood operations we prefer to use the salts obtained by partial or total neutralization with carboxy acids, particularly monocarboxy acids having not over 6 carbon atoms and preferably a hydroxylated acid such as hydroxyacetic acid.

Specific attention is directed to the article entitled "Preparation of Water for Injection Into Water Reservoirs," which appeared in the Journal of Petroleum Technology, volume 7, No. 4, page 9 (April 1955). The author is Torrey.

PART 6

The products obtained in the manner herein described are valuable for various purposes as indicated in Part 5, preceding. Where salts can be formed, i.e., where the products are basic in character this applies to the salts as well as to unneutralized material. However, one of the most important uses for the herein described products is as an intermediate for further reaction. It is obvious that reactions of the kind described previously invariably and inevitably yield oxyalkylation susceptible compounds, products or cogeneric mixtures. The reason is that when the oxirane ring is opened there is produced a hydroxyl group. This hydroxyl group is susceptible to oxyalkylation and there may be present other groups which likewise are susceptible to oxyalkylation as, for example, an epoxidized soya-bean oil is reacted with 1, 2 or 3 moles of a polyamine. Thus the products previously described may be combined with a variety of reactants as chemical intermediates, for instance, with various diepoxides or polyepoxides. They may be combined with a number of other monoepoxides such as epichlorohydrin, styrene oxide, glycide and methylglycide. They may be reacted with alkyl glycidyl ether, glycidyl isopropyl ether, and glycidyl phenyl ether.

Furthermore, such products may be reacted with alkylene imines such as ethylene imine or propylene imine, to produce cation-active materials. Instead of an imine, one may employ what is a somewhat equivalent material, to wit, a dialkylaminoepoxypropane of the structure

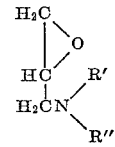

wherein R' and R" are alkyl groups.

Likewise, since the products have a hydroxyl group they may be combined by esterification with carboxy acids such as high fatty acids, so as to change their characteristics or with polycarboxy acids, such as diglycolic, maleic acid, phthalic acid, succinic acid, and the like, to give resins, soft polymers or fractional esters which are essentially monomeric.

A variety of compounds can be formed by merely heating the reaction mass to a higher temperature and indeed sometimes in an effort to maintain a maximum yield of the desired compound there may be formed other products as a result of the change which takes place at least in part after the principal product of reaction has been formed. Without attempting to indicate the variety of complex reactions which can take place and also from the standpoint of indicating why in the hereto attached claims the products are described by method of manufacture, it may be well to illustrate the matter by reference to one of the cheaper commercially available epoxidized products, to wit, the epoxidized butyl ester of soybean fatty acids. Such epoxidized ester can be reacted with at least 2 moles of the polyamine. Theoretically and actually at least one mole of the polyamine can be caused to react with at least each oxirane ring that appears in the ester, for instance, one to three oxirane rings depending on the nature of the acid radical of the ester.

Bearing in mind the ester also can react to form at least a simple amide in the same way that the fatty acid itself can do so, it is obvious that by virtue of the acyl radical the ester can additionally react with one mole of a polyamine to form an amide or amino amide.

Furthermore, without attempting to examine the complexity of possible reactions it is obvious also that one mole of a polyamine can combine with 2 moles of an epoxidized ester having, for example, one oxirane ring per fatty acid molecule only. Such product so obtained can then be reacted additionally with 2 moles of the polyamine involving the two acyl radicals.

Since the monohydric alcohol ester, like any other fatty acid equivalent, could act as an acylating agent it is obvious that amides could be formed and perhaps the simplest illustration is concerned with the non-saturated acid or, at least an acid which contains no oxirane ring as above depicted and may be indicated thus:

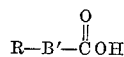

The amide formation from a polyethylene amine would be indicated thus:

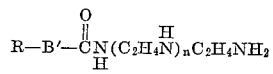

in which $n$ is a small whole number such as 1, 2, 3 or 4.

Needless to say, the amide or rather the amino amide of the polyamine, is readily convertible into a cyclic amidine which further complicates the possibilities of reaction.

As noted in the previous text it is well known, of course, that the amides of polyamines which are characterized by a primary amino radical and a secondary amino radical separated by 2 or 3 carbon atoms on heating yield cyclic amidines, and in the case of polyethyleneamines yield imidazolines. Various derivatives, of course, also are obtainable, such as amido imidazolines, etc. Without going further into the complexity of the invention as herein stated it is obvious it includes a variety of materials resulting from an initial reaction of an oxirane ring as specified and may result in amidification where the formation of cyclic amidines at a point above the initial reaction temperature and a point below pyrolysis. The formation of amides of cyclic amidines may be varied by the addition of more monocarboxy acids; in fact, different carboxy acids may be added, or if desired one can add dicarboxy acids. For this reason the present invention is limited merely to the reaction involving the rupture of the oxirane ring, subject to certain qualifications.

Actually, the complexities of epoxidized products go further in that when polyethylenic monohydric alcohol esters are subjected to epoxidation the oxirane ring may be formed and may be opened so as to form a hydroxyl group, or a dihydroxy group with one ring being left intact. Previous reference has been made to the butyl ester of 9,10-epoxystearic acid. If any such ester or comparable ester is described thus, R—A—R', where R' is the alcoholic residue having less than 8 carbon atoms and if the acid radical itself is indicated as R—A—, then it becomes obvious one can readily obtain a dihydric alcohol radical in the course of reaction, which may be indicated thus:

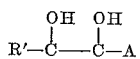

Again if one starts with an unsaturated hydroxy fatty acid ester, such as an ester of ricinoleic acid, it is possible to introduce a group like an acetyl group or an oleyl group and have a radical comparable to the following:

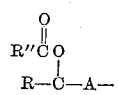

It is obvious that heating such ester can form a further variety of products which would not be true in the absence of an acyl radical esterified in the hydroxyl position.

Stated another way, although the effort as far as this example goes is simply to react an epoxidized monohydric alcohol ester of the kind described with a polyamine of the kind described so as to open the oxirane ring and not necessarily go any further, yet it follows that as one tries to get a high yield in such reaction invariably and inevitably some other reaction, i.e., some sort of side reaction, may take place. Thus, although the products are described as reaction products involving an oxirane ring and the epoxidized monohydric alcohol ester yet these side reactions may introduce and yield an appreciable amount in some instances of some of the products herein mentioned.

Again, it has been pointed out that the acyl radical carrying the oxirane ring also may contain a single hydroxyl or two hydroxyls as the result of the opening of an oxirane ring by reaction with water. Furthermore, when the polyamine reacted with the oxirane ring there is a hydroxyl formed on the adjacent carbon atom. Thus, various reactions may take place involving one or more of these hydroxyl groups as, for instance, dehydration with the formation of an unsaturated bond, esterification or perhaps even in some instances the re-forming of an oxirane ring from 2 adjacent hydroxyl groups with ultimate reaction. All of which emphasizes the complexity of the reactions involved, or rather the complexity of possible side reactions when one is attempting to produce mainly and substantially the initial resultant of the polyamine herein described and the epoxidized reactant.

Referring to the mixed epoxidized derivative, for instance, epoxidized butyl soyate or, for that matter, any ester of soybean fatty acid or the like, it is obvious one can react with the polyamine such as triethylene tetramine or tetraethylene pentamine and form the product of the kind previously described. One can add another mole of such polyamine and neutralize the carboxyl radical or eliminate the alkyl radical and heat such product so as to form a cyclic amidine by reaction involving the carboxyl radical or its equivalent.

Elsewhere reference has been made to the formation of dicarboxy acids by the reaction of glycol with 2 moles of epoxidized soybean fatty acid or methyl ester thereof. Similarly, glycerol, oxyalkylated glycerol, trimethylolethane, trimethylolpropane, or oxyalkylated derivatives thereof can be combined so as to form a tricarboxy acid. Similarly, diglycerol, pentaerythritol or the like and oxyalkylated derivatives thereof can be combined with 4 moles of epoxidized fatty acid or an ester thereof to form a tetracarboxy acid. Similarly, sorbitol, oxyalkylated sorbitol, dipentaerythritol, and oxyalkylated dipentaerythritol can be combined with 6 moles of epoxidized soybean fatty acid or esters of the same.

Such reactions are not limited to polyols of the kind described but also may be applied to polyols having basic nitrogen atoms obtained by reacting ethylene diamine, diethylene triamine, triethylene tetramine, tetraethylene pentamine, with a plurality of moles of an olefin oxide such as ethylene oxide, propylene oxide, butylene oxide and glycide and then reacting such polyols with a plurality of moles of epoxidized soya-bean oil or esters thereof as previously described.

In attempting to obtain esters from suitable unsaturated alcohols such as allyl alcohol or the like other complications enter into the reaction and, generally speaking, there is nothing to be gained by attempting to use such ester. Furthermore, in the use of such ester complications again may enter when one attempts to react with various compounds such as polyamines. The same also applies if one takes an ester such as ethyl, methyl or butyl ricinoleate and reacts with acrylic acid, crotonic acid, or the like. Here, again, the epoxidized products derived from such esters may enter into side reactions which are even more complicated than those which are previously suggested. Another example illustrating this type of reactant is the ester obtained by esterifying low molal esters of ricinoleic acid with sorbic acid.

As is obvious, if products of the kind herein described are saponified and acidified under appropriate conditions it is possible to obtain an inner salt involving a basic amino radical and the residual carboxyl radical. However, if such product, or a suitable intermediate, or the initial product itself, is saponified with a strong base, such as caustic soda or caustic potash, or the like, the resultant product is characterized by the presence of the metallic ion, for instance, sodium or potassium, in the carboxyl position, and the amino group is merely part of the acyl radical. Both types of products can be obtained by conventional means from the herein described resultants, i.e., either the so-called free acid which in essence is really an inner salt, or the salt involving the use of sodium hydroxide, potasisum hydroxide, or the like. The products so obtained, whether metallic salts or inner salts, are effective for prevention of corrosion not only in anaerobic systems but also in aerobic systems.

Also, it is to be noted that one need not use sodium hydroxide or potassium hydroxide in the above described compounds but one may also use a quaternary ammonium base, particularly a base whose basicity is greater than the terminal amino group in the acyl radical.

Also, it is to be noted that if one prepares the salts of metal, such as magnesium, aluminum, barium, or the like, the products so obtained are effective for the same purpose and particularly in a hydrophobe system, and also are valuable as additives to lubricating oils, fuel oils, and the like.

What has been said previously in regard to the formation of alkali metal salts (sodium, potassium, and lithium) and in regard to the formation of inner salts, is an oversimplification insofar that we are aware that in some instances steric hindrance prevents the formation of an inner salt but does not prevent the formation of intramolecular salts. Thus, in some instances such intramolecular salts have unusual properties including uses for the purpose above indicated for the alkali metal salts or the inner salts.

Having thus described our invention what we claim as new and desire to secure by Letters Patent, is

1. Products obtained by reacting at a temperature of about 110° to 160° C. for from about two to four hours substantially equal molar proportions of (A) an epoxidized ester of a lower alkanol and a monocarboxylic acid composed of carbon, hydrogen and oxygen atoms, said acid having from 8 to 22 carbon atoms, the epoxidized ester containing on the average approximately one oxirane ring in the acyl radical and being devoid of an oxirane ring in the alkanol radical, the acyl radical prior to epoxidation being free from any residual hydroxyl radical and conjugated ethylenic linkages, with (B) an oxyalkylation-susceptible polyamino compound composed of carbon, hydrogen, oxygen and nitrogen atoms, having only functional groups selected from the class consisting of hydroxyl groups, primary amino groups and secondary amino groups and having at least one such functional amino group; said reaction between (A) and (B) involving rupture of the oxirane ring and being limited to formation of one of the following groupings

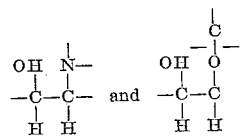

2. Products of claim 1 wherein the polyamino compound is a polyethylene polyamine having up to 7 nitrogen atoms.

3. The product of claim 1 in which the polyamine is ethylene diamine.

4. The product of claim 2 in which the polyamine is diethylene triamine.

5. The product of claim 2 in which the polyamine is triethylene tetramine.

6. The product of claim 2 in which the polyamine is tetraethylene pentamine.

7. Products obtained by reacting substantially equal molar proportions of a lower alkanol ester of an epoxidized higher fatty acid composed only of carbon, hydrogen and oxygen atoms, the epoxidized ester containing on the average approximately one oxirane ring, with an alkylene polyamine of the formula $H(HN-R)_nNH_2$ wherein R is alkylene and $n$ is an integer; said reaction involving rupture of the oxirane ring and being substantially limited to formation of the group

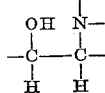

8. Products obtained by reacting solely a lower alkanol ester of an epoxidized higher fatty acid composed of carbon, hydrogen, and oxygen atoms, the epoxidized ester containing on the average approximately one oxirane ring, with an alkylene polyamine of the formula $$H(HN-R)_nNH_2$$

wherein R is alkylene and $n$ is an integer; said reaction involving both (a) rupture of the oxirane ring and formation of the group

and (b) amidification at the ester group.

9. Products obtained by reacting solely an epoxidized higher fatty acid composed of carbon, hydrogen, and oxygen atoms, the epoxidized acid containing on the average approximately one oxirane ring, with an alkylene polyamine of the formula $H(HN-R)_nNH_2$ wherein R is alkylene and $n$ is an integer; said reacting involving both (a) rupture of the oxirane ring and formation of the group

and (b) amidification at the carboxyl group.

10. The product obtained by reacting an epoxidized monoester of a monohydric fatty alcohol and a monocarboxylic higher fatty acid, said ester composed only of carbon, hydrogen and oxygen atoms, the epoxidized ester containing an oxirane ring only in the fatty acid radical, with an alkylene polyamine of the formula $H(HN-R)_nNH_2$ wherein R is alkylene and $n$ is an integer, said reaction involving rupture of the oxirane ring and being substantially limited to the formation of the group

References Cited in the file of this patent
UNITED STATES PATENTS

| | | |
|---|---|---|
| 2,445,892 | Swern et al. | July 27, 1948 |
| 2,542,062 | Swern | Feb. 20, 1951 |
| 2,585,115 | Greenlee | Feb. 12, 1952 |
| 2,615,007 | Greenlee | Oct. 21, 1952 |
| 2,682,514 | Newey | June 29, 1954 |
| 2,712,535 | Fisch | July 5, 1955 |
| 2,761,870 | Payne et al. | Sept. 4, 1956 |
| 2,778,855 | Shokal et al. | Jan. 22, 1957 |